United States Patent [19]
Taylor et al.

[11] 3,791,851
[45] Feb. 12, 1974

[54] PROCESS FOR HEAT TREATING PLASMA-CONSOLIDATED BERYLLIUM

[75] Inventors: Thomas A. Taylor; Robert J. Baird, both of Indianapolis, Ind.

[73] Assignee: Union Carbide Corporation, New York, N.Y.

[22] Filed: Sept. 28, 1970

[21] Appl. No.: 76,258

[52] U.S. Cl............... 117/93.1 PF, 75/200, 75/227, 117/105.2, 117/119.6, 264/60, 264/66
[51] Int. Cl................................................. B05k 7/22
[58] Field of Search 117/93.1 PF, 105, 105.1, 105.2, 117/119.6; 75/200, 211, 227; 264/56, 60, 65, 66

[56] References Cited
UNITED STATES PATENTS

| 3,112,165 | 11/1963 | Davies | 75/200 |
|---|---|---|---|
| 3,115,408 | 12/1963 | Knight | 75/200 |
| 3,305,358 | 2/1967 | Lirones | 75/211 |
| 3,576,932 | 4/1971 | Biddulph | 264/65 |
| 3,053,610 | 9/1962 | Shichman | 117/105 |
| 3,532,493 | 10/1970 | Chay | 75/227 |

OTHER PUBLICATIONS

Foos et al., "Micro–Alloying Relationships in Beryllium" from National Material Advisor Board, publication NMAB–272, July 1970.

*Primary Examiner*—Alfred L. Leavitt
*Assistant Examiner*—John H. Newsome
*Attorney, Agent, or Firm*—James C. Arvantes; Harrie M. Humphreys; Robert C. Cummings

[57] ABSTRACT

A three stage process for heat treating plasma-consolidated beryllium to produce highly densified beryllium having a theoretical density greater than 99 percent.

10 Claims, No Drawings

PROCESS FOR HEAT TREATING PLASMA-CONSOLIDATED BERYLLIUM

1. Field Of The Invention

This invention relates to a process for heat treating plasma-deposited beryllium so as to produce a highly densified substantially isotropic polycrystal beryllium article having excellent mechanical and physical properties. The process comprises essentially a three-stage procedure whereby the plasma-deposited beryllium is first subjected to a temperature controlled outgassing desorption stage, followed by a temperature controlled sintering stage for densifying the beryllium article and then concluding with a temperature regulated cooling stage to control the impurity distribution in the beryllium through solution and/or precipitation reactions.

2. Description Of The Prior Art

Beryllium offers a combination of low density and high strength which make it a desirable product for use as an aerospace structural material. In addition, its thermal and hardening properties makes it attractive as a heat sink and thus qualifies it for use as a skin covering for aerodynamical vehicles. The large thin-wall shapes required for aerodynamic applications are difficult to fabricate and are quite expensive to produce. It is common practice to first forge or hot-press a large block of beryllium and then machine it to provide a desired smaller-shaped article. The expense incurred in the machining operation plus the waste of the scraps therefrom results in an expensive finish product. Another method of fabricating beryllium shaped articles is to first produce beryllium sheets and then form the sheets to the particular shape desired. This method of fabrication not only produces an unattractive article but also an expensive one since the sheets usually have to be joined thereby requiring an additional costly operational step.

A significant advancement in the fabrication of unitary thin-wall beryllium shapes has recently been devised by using the plasma arc-torch coating technique described in U.S. Pat. Nos. 2,858,411 and 3,016,447. Basically plasma arc coating is a method for continually depositing a powder coating material on the surface of a workpiece. An electric arc between a non-consumable stick electrode and a spaced apart second electrode is provided whereupon a stream of gas is then passed in contact with the stick electrode to be contained therein thus forming an arc-containing gas stream. A portion of the gas stream is wall-stabilized so as to collimate the energy of the arc thus providing a high thermal content effluent. Coating material, such as beryllium in the powder form, is then passed into the stream whereupon the heat of the high thermal content effluent melts and propels the coating material onto the workpiece thereby resulting in an evenly applied, fine grain size coating on the workpiece. This coating process is continued until a uniform layer of the precise thickness is deposited on the workpiece. Thus various shapes can be fabricated quickly and economically. The drawback with this fabrication technique, however, is that it results in a plasma-consolidated end product having less than full theoretical density and relatively poor mechanical properties thus limiting its use to applications where density and strength are not critical.

SUMMARY OF THE INVENTION

The present invention is directed to a process for heat treating as-coated plasma-consolidated beryllium articles so as to convert them to high density beryllium articles having greatly increased strength and ductility.

Specifically, a plasma-consolidated, pre-shaped beryllium article is first prepared using the plasma arc-torch coating technique. The specific size of the beryllium powder to be used in the plasma arc-torch process to prepare the beryllium article is somewhat important since the coating efficiency of the process and the article's mechanical properties of strength and ductility are somewhat dependent upon the powder size of the coating material, i.e. powder size between 10 microns and 50 microns will provide optimum coating efficiency and higher mechanical properties for the coated article. From experimentation it has been found that a powder size of 325 Tyler mesh (44 microns) and finer provides a good efficient coating process while yielding a consolidated layer of beryllium having good mechanical properties. However, with the design of larger powered arc torches than are commercially available today, it may be possible to increase the size of the beryllium powder to be used since a larger size arc would produce more heat which could effectively melt larger size powder particles prior to propelling them onto the workpiece.

Another variation in the as-coated plasma consolidated beryllium article to be evaluated is the density of the article with reference to a 100 percent theoretical density corrected for BeO contents according to the formula $$\text{Theoretical density} = \frac{100}{\frac{100 - \%\text{BeO}}{1.8477} + \frac{\%\text{BeO}}{3.009}}$$

Densities between 78 and 93 percent theoretical have been found in as-coated beryllium samples and using the beryllium samples with density values near this lower density range, it was found that it was difficult and even impossible to increase the density value of the article according to the heat treating process of this invention to above 99 percent theoretical without excessively increasing the grain growth in the final product. Thus a density greater than 85 percent theoretical and preferably greater than 87 percent theoretical have been found to be required in utilizing the process of this invention to produce an end product with a density greater than 99 percent theoretical without unduly increasing the grain size of the product.

A third variation to be considered before subjecting the as-coated plasma-consolidated beryllium article to the heat treating process of this invention, is its oxygen contents expressed as the percentage of BeO by weight of the article. At higher oxide levels, not only is the strength and elastic modulus properties enhanced but also the sintered grain size is decreased. A BeO percentage, by weight of the beryllium, of between about 1.5 and about 2.5 percent, and preferably about 2.0 percent, is desirable for use with this process in obtaining a densified, high strength end product, although a BeO content up to 6 percent can produce a high density usable beryllium product. For example, an as-coated article with 1.7 percent BeO yields a beryllium product, after the heat treating process of this invention, having a grain size of 18 microns and a tensile strength at 26°C of 40,625 pounds per square inch while a similar as-coated article with 2.2 percent BeO yields a product having a grain size of 6 microns and at 26°C, a tensile strength of 56,264 pounds per square inch. Thus by selecting the BeO contents in the as-coated article, the grain size and mechanical properties of the final product can be controlled. The exact percentage of BeO can be adjusted through the plasma-consolidation process, that is, the particular arc torch used, the particular beryllium powder employed and the size and intensity of the arc developed during the plasma spraying operation.

By selectively electing the desired values of the above-specified variables and then subjecting the plasma-consolidated beryllium article to the time-temperature profile of the heat treatment of this invention, a highly densified, substantially isotropic polycrystal beryllium article having excellent ductility and strength properties can be produced. Thus prior to initiating the heat treatment of this invention, the as-coated plasma consolidated articles should have a density greater than 85 percent theoretical and a BeO content of up to 6 percent and preferably between about 1.5 and about 2.5 percent by weight.

A substantially isotropic polycrystal beryllium article is intended to mean an article having orientation factors $\Phi_{ij}$ equal to no higher than 0.2 and defined as $$\Phi_{ij} = (|I_{ij} - \bar{I}_j|)/\bar{I}_j$$

where
$\Phi_{ij}$ equals the orientation factor for X-ray reflection $j$ measured on face $i$ of a cubical specimen having orthogonally disposed faces.
$i$ the subscript denoting the particular face of the specimen under examination ($i = 1, 2$ or $3$).
$j$ the subscript denoting the specific X-ray reflection from the following planes of the specimen:

$10\bar{1}0, 0002, 10\bar{1}1, 11\bar{2}0, 10\bar{1}3$ and $11\bar{2}2$.

$I_{ij}$ equal the integrated X-ray intensity from face $i$ for a specific reflection, $j$.
$\bar{I}_j$ equals the average integrated X-ray intensity determined from three faces of a cubical specimen for a specific reflection $j$.

Thus by examining the crystallographic texture of a beryllium article by X-ray diffraction means, the exact grain orientation factor of the article can easily be calculated and when the article is heat treated according to this invention, it will have an orientation factor of 0.2 or less according to the above formulas.

High density is intended to mean a density of greater than 99 percent theoretical based on a 100 percent theoretical density for beryllium corrected for BeO contents according to the formula $$\text{Theoretical density} = \frac{100}{\frac{100 - \% \text{BeO}}{1.8477} + \frac{\% \text{BeO}}{3.009}}$$

The first stage of the heat treating process according to this invention is initiated by placing an as-coated plasma-consolidated beryllium article having a theoretical density greater than 85 percent and BeO contents up to 6 percent and preferably between about 1.5 and about 2.5 percent by weight, into a substantial vacuum and controllably heating the article to outgas and/or thermally desorb the contaminents occupying the pores and pore surfaces of the article, such as gases and condensed gases, respectively. The source of some of these contaminents can be attributed to normal air (nitrogen and oxygen), arc-torch gas (mainly argon), substrate coolant (mainly $CO_2$) and adsorbed moisture ($H_2O$) since these contaminents are usually present in all plasma-consolidated coatings. The article during this outgassing desorption stage can be heated at a rate and for a time period necessary to reduce the typical as-coated adsorbed gas level of approximately $10^{-2}$ moles per cubic centimeter of porosity or void to at least $10^{-4}$ moles per cubic centimeter of porosity and preferably to $10^{-5}$ moles per cubic centimeter of porosity. However, the temperature has to remain below the temperature where the internal porosity is closed off from the surface through evaporation-condensation and densification shrinkage mechanisms. This upper temperature level referred to as the sintering start temperature, is a function of the density of the as-coated beryllium article and can be as low as 600°C for as-coated articles having a 90 percent theoretical density whereas an as-coated article having an 85 percent theoretical density requires a temperature of about 700°C to commence internal porosity closure. Generally this outgassing desorption stage can be successfully implemented by placing the article in a vacuum of less than $10^{-5}$ torr and then subjecting it to a time-temperature heating profile of less than 10°C per minute and preferably about 4°C per minute. Another heating procedure is to rapidly heat the article in a substantial vacuum to about 500°C and then holding thereat for at least 30 minutes to insure that the level of contaminents has decreased to a tolerable level of less than $10^{-4}$ moles per cubic centimeter of porosity.

The substantially outgassed article is then subject to a heating stage whereby the temperature is increased to a level where full densification of the article will occur, such temperature being the sintering temperature and being at least 1,180°C. The article is then held at this temperature until a density of greater than 99 percent theoretical is obtained. The time period for maintaining the article in this high temperature environment is somewhat limited since prolonged exposure to high temperature will increase the grain size of the article and thereby decrease its mechanical properties. In general, heating the outgassed article to a temperature between at least 1,180°C and about 1,250°C for a period of between about 15 minutes and about 6 hours will be sufficient to successfully densify the article to above 99 percent theoretical without substantially increasing the grain size of the article. Preferably heating the outgassed article to 1,200°C ± 10°C for a period of 3.5 hours ± 0.5 hours will be sufficient to produce an excellent densified beryllium article based on initial as-coated beryllium article having a density greater than 85 percent theoretical and a BeO content preferably between about 1.5 and about 2.5 percent by weight. This densification stage of the process should be carried out in an enclosed heated zone slightly larger than the beryllium article so as to minimize the overall evaporation loss of the beryllium. The exact ratio of volume of the heated zone to surface area of the article is not critical to the process but a ratio of not greater than 1.0 inch is preferred.

The highly densified beryllium article is then subjected to the third and final stage of the heat treating process whereby it is controllably cooled at a rate sufficient to control the impurity distribution within the article by solution and/or precipitation reactions to produce a strong and ductile beryllium article. Commercially available beryllium is actually a multi-phase alloy since impurities contained therein, such as aluminum and silicon, have extremely low solubility and are forced to reside mainly at the grain boundaries. For example, at temperatures within the range of 400°C to 700°C, aluminum and silicon eutectics with beryllium can form thereby resulting in loss of ductility to the article. However, aluminum can react with the impurity iron and beryllium to form a refractive intermetallic which can restore any loss of ductility to the article. Thus a time-temperature cooling profile following the densification stage of the process is required to produce and distribute within the article at least one of the beryllium compounds in the group consisting of AlFeBe$_4$, AlFeBe$_5$, FeBe$_{11}$, FeBe$_{12}$ and similar compounds with substitution of silicon and other transition metal elements, so that the physical properties of the article will not be substantially reduced. For example, by reacting free aluminum or silicon with iron and beryllium to form compounds of the general type AlFeBe$_4$, we can avoid having free aluminum and silicon at the grain boundaries where they could decrease the ductility of the beryllium article.

A cooling rate of between about 1°C and about 10°C per minute is sufficient to substantially control the impurity distribution within the beryllium article during this final stage of the process to produce a very desirable finished product. Preferably a cooling rate of between about 1.5°C and about 2°C per minute is desirable. It is also possible to rapidly cool down the article to a temperature between about 500°C and about 750°C and then age or hold the article thereat for a period of at least 10 hours to produce the desired solution and/or precipitation reactions.

Where it is required that there be no extraordinary ductility loss at temperatures of about 500°C, then an additional aging step will become necessary whereby the article is maintained, after the substantial impurity distribution stage, at a temperature of between about 500°C and about 750°C for a time period between about 10 hours and about 100 hours.

The exact time-temperature profile of the heat treating process of this invention to be used for any particular shaped article depends on the initial properties of the as-coated plasma-consolidated beryllium article including its impurity contents. In addition, the temperature range and time duration for each stage of this process will also be a function of the properties desired in the finished product which is usually dictated by its intended applicational use.

EXAMPLE 1

A standard grade powder was plasma-consolidated with arc-torch operating conditions as follows:

| | |
|---|---|
| Powder size | 325 Tyler Mesh and finer |
| Electrode Gas | Argon |
| Powder Carrier Gas | Argon-Hydrogen |
| Current of Arc Torch | 150–200 amperes |
| Voltage of Arc Torch | 55–70 volts |
| Torch Pressure | 29–34 psig |
| Dispenser Pressure | 36–39 psig |
| Shield | None |
| Coating Time | 7 Hr. 55 Minutes |
| Coating Thickness | 0.500 inch |
| Powder Feed Rate | 13 grams per minute |
| Anode Type | Copper Anode |
| Torch Standoff | 1.5 inches |

The chemical analysis of the beryllium powder was as follows:

| | |
|---|---|
| % Be | 98.48 |
| BeO | 1.10 |
| Al | 0.06 |
| C | 0.14 |
| Fe | 0.15 |
| Mg | 0.02 |
| Si | 0.05 |

The plated article was a flat disc measuring 0.5 inch thck and 19 inches in diameter. The as-plated density, measured by standard water-displacement method as described in ASTM Designation B 328-60, 1968 Book of ASTM Standards, Part 7, Page 440, was 1.59 grams per cubic centimeter. The oxygen content was determined by neutron activation to be 2.2 percent as BeO. The as-coated density, corrected for oxygen content, was 85.5 percent of theoretical.

The disc was cut into approximately 5 × 5 inch plates and enclosed in a tight-fitting box of graphite, coated in the inside with a BeO reaction barrier. The box was evacuated to 10$^{-5}$ torr and heated to 800°C at 4°C per minute. At this point the furnace chamber was back-filled with argon at 100 microns of pressure and then the heating continued at 4°C per minute until reaching 1,200 to 1,205°C where the sample was held for four hours. Cooling to room temperature was then commenced under the same argon atmosphere at a cooling rate of 1.7°C per minute.

Specimens were cut from this sintered plate and measured for density. Based on 2.2 percent BeO (as-analyzed), the heat treated density was 100 percent theoretical, corrected for BeO content. The heat treated grain size by the linear intercept method gave a 6 microns average. The bars were then machined to the tensile specimen configuration of ASTM-E8, using a Tensile-Grind contouring machine. Each specimen was hand polished down to 400 grit SiC abrasive paper, then electrochemically etched to remove 0.002 – 0.003 inch per side. The etching conditions were

| | |
|---|---|
| solution: | 60% phosphoric acid<br>35% glycerine<br>5% of 50% Chromic acid solution |
| voltage: | 18–20 |
| temperature: | 60°–80°C with stirring of solution and agitation of the specimen |

The tensile specimens were tested at various temperatures in a model TM Instron tensile machine.

Similar sintered bars were prepared as above, except before the final electropolish, they were aged in vacuum for various times at various temperatures, and then tested in tension. Table 1 includes the complete numerical finding for all the above tests. The orientation factors for this sample were found to be under 0.09 as ascertained from the above formula and are shown in Table 2.

TABLE 1

Elevated Temperature Tensile Properties

Bar A
"As-densified" condition (no aging or stress relieving)
Strain rate: 0.004 in/in/min

| T, °C | YS (psi) 0.2 (Yield strength at 0.2% offset) | UTS (psi) Ultimate Tensile Strength | $E_f$, % (elongation) |
|---|---|---|---|
| Room Temp. | 48,598 | 58,880 | 2.53 |
| 100 | 50,990 | 56,930 | 4.65 |
| 200 | 49,808 | 51,830 | 4.38 |
| 300 | 46,111 | 46,296 | 12.4 |
| 400 | 40,463 | 43,704 | 10.64 |
| 500 | 29,798 | 35,353 | 7.76 |
| 600 | 18,704 | 20,278 | 7.11 |
| 700 | 6,796 | 7,573 | 5.12 |

Bar B
"As-densified" condition (no aging or stress relieving)
Strain rate: .08 in/in/min

| T, °C | YS (psi) 0.2 | UTS (psi) | $E_f$, % |
|---|---|---|---|
| 100 | 45,980 | 56,667 | 3.55 |
| 300 | 49,333 | 50,111 | 3.74 |
| 400 | 42,340 | 44,681 | 14.69 |
| 500 | 31,982 | 40,090 | 10.02 |
| 600 | 26,636 | 22,626 | 14.08 |
| 700 | 13,119 | 13,486 | 10.16 |

Bar C
Aged 12 hr. at 600°C   Strain rate: 0.004 in/in/min

| T, °C | YS (psi) 0.2 | UTS (psi) | $E_f$, % |
|---|---|---|---|
| 26 | 47,776 | 57,021 | 2.08 |
| 300 | 36,022 | 41,935 | 14.8 |
| 500 | 27,419 | 33,011 | 10.36 |
| 700 | 7,312 | 7,419 | 2.76 |

Bar D
Aged 100 hr. at 600°C   Strain rate: 0.004 in/in/min

| 26 | 49,247 | 61,290 | 2.4 |
|---|---|---|---|
| 300 | 35,444 | 45,556 | 18.91 |
| 500 | 28,587 | 32,174 | 9.12 |
| 700 | 8,851 | 9,195 | 2.66 |

Bar E
Aged 200 hr. at 600°C   Strain rate: 0.004 in/in/min

| 26 | 42,935 | 51,522 | 0.98 |
|---|---|---|---|
| 300 | 33,542 | 44,896 | 14.89 |
| 500 | 26,559 | 29,140 | 8.34 |
| 700 | 6,947 | 7,579 | 2.0 |

Aged 12 hr. at 740°C   Strain rate: 0.004 in/in/min

| 26 | 46,044 | 56,264 | 2.88 |
|---|---|---|---|
| 300 | 40,879 | 46,154 | 14.32 |
| 500 | 30,769 | 36,044 | 10.26 |
| 700 | 6,484 | 7,363 | 4.28 |

Aged 100 hr. at 750°C   Strain rate: 0.004 in/in/min

| 26 | 51,667 | 55,778 | 0.90 |
|---|---|---|---|
| 300 | 45,536 | 47,946 | 13.43 |
| 500 | 32,571 | 38,857 | 9.28 |
| 700 | 7,091 | 7,364 | 4.28 |

The yield strength and tensile strength of the above plasma-consolidated beryllium article, at room temperature, are much higher than the yield strength and tensile strength specifications for hot-pressed beryllium blocks which are 35,000 psi and 48,000 psi respectively.

TABLE 2

Orientation Factors for Sintered Plasma-Consolidated Beryllium of Example 1

| j(plane) | $\bar{I}_j$ | Orientation Factor, $\Phi_{ij}$ | | |
|---|---|---|---|---|
| | | i=1 | i=2 | i=3 |
| $10\bar{1}0$ | 31.7 | 0.022 | 0.041 | 0.016 |
| $0002$ | 34.1 | 0.004 | 0.012 | 0.032 |
| $10\bar{1}1$ | 100.0 | 0.0 | 0.0 | 0.0 |
| $11\bar{2}0$ | 21.9 | 0.037 | 0.027 | 0.014 |
| $10\bar{1}3$ | 21.9 | 0.046 | 0.032 | 0.082 |
| $11\bar{2}2$ | 31.8 | 0.012 | 0.044 | 0.057 |

EXAMPLE II

A low oxygen grade of beryllium powder was plasma-consolidated with arc-torch operating conditions as follows:

| | |
|---|---|
| Powder Size | 325 Tyler Mesh and finer |
| Electrode Gas | Argon |
| Powder Carrier Gas | Argon-Hydrogen |
| Current | 200 amperes |
| Voltage | 58 volts |
| Torch Pressure | 34 psig |
| Dispenser Pressure | 37 psig |
| Shield | none |
| Coating Time | 5.5 hr. |
| Coating Thickness | 1.225 in. |
| Powder Feed Rate | 12.8 grams per minute |
| Anode Type | Copper Anode |
| Torch Standoff | 1.5 in. |

The chemical analysis of the beryllium powder was as follows:

| | |
|---|---|
| % Be | 99.041 |
| BeO | 0.670 |
| Al | 0.047 |
| C | 0.050 |
| Fe | 0.098 |
| Mg | 0.042 |
| Si | 0.052 |

The geometry of this plated article was a thick-walled cylinder, 3.38 inches inside dimaeter, 5.84 inches outside diameter, and 3.81 inches high. The coating substrate was an aluminum tube, prepared by grit-blasting the bonding surface.

This beryllium article was heat treated in a special graphite enclosure. The enclosure was a cylindrical chamber, slightly larger than the beryllium object, and coated on all inside surfaces with BeO. This arrangement of enclosure and Be cylinder was evacuated to $10^{-5}$ mm Hg pressure, then heated at a rate of 4°C/min. At 800°C, the furnace was brought to a 100 micron pressure of argon. At 1,200°C, the temperature was held constant for 4 hours. Cooling under argon pressure was at a rate of 1.7°C/minute.

The oxygen content after sintering was found to be 1.7 percent as BeO, by neutron activation analysis. Density was measured by the water displacement method to be 1.855 gm/cm$^3$, or 99.9 percent theoretical, corrected for BeO. The average linear intercept grain diameter was 18.3 microns.

Samples were cut in various orientations from the sintered thick-walled cylinder for mechanical tests. First, compression test samples were cut with the stress axis (1) parallel to the radial direction, (2) parallel to the cylinders length, and (3) parallel to a line tangent to the cylinder and perpendicular to the cylinders length. These samples were carefully machined by surface grinding, then 0.002–0.003 inches were removed from each surface by chemical etching. The etchant had the composition:

17% HNO$_3$ (concentrated)
1% HF (49%)
82% Distilled water

The results of room temperature compression tests as a function of sample orientation are given in Table 3. Testing was done on a Tinius-Olsen 20,000 lb. machine, measuring strain with a Tinius-Olsen deflectometer. The strain rate was 0.010 inch/inch/minute. Treating the data with a two-sided *t*-test, the measurement for yield stress at 0.2 percent strain was found to have no distinguishable difference at a 95 percent level of confidence, for all three orientations. This shows that isotropic mechanical properties are characteristic of this sintered plasma-consolidated beryllium article.

Tensile specimens were cut so that the stress axis would be in the cylinders longitudinal and tangential orientations. The samples were flat sheets, ground to ASTM-E-8 specifications. These samples were aged in vacuum for 12 hours at 738°C, then electropolished to remove 0.002–0.003 inches from each surface. These tensile specimens were tested at various temperatures, from 25°C to 650°C. The testing apparatus was a model TM Instron operating at constant cross-head speed (strain rate equal to 0.004 inches/inch/minute at start of test). Strain was taken from cross-head motion. Table 4 shows the results for the yield stress at 0.2 percent strain, the ultimate tensile stress, and the total plastic strain to fracture. These results show that substantially the same tensile properties are obtained as a function of temperature for both the tangential and longitudinal orientations.

Similar tensile specimens were prepared, except for the electropolishing step, then aged in vacuum for various times at 600°C and 740°C. The samples were then electropolished to remove 0.002–0.003 inches per surface. The tensile strain rate was initially 0.004 inches/inch/minute, and the corresponding cross-head speed was held constant throughout the test. Table 5 gives the complete tabulation of tensile properties: yield strength, ultimate strength, and strain to fracture. The orientation factors for these samples were found to be under 0.16 using the formula $$\Phi_{ij} = (|I_{ij} - \overline{I}_j|)/\overline{I}_j$$

and are shown in Table 6.

TABLE 3

Compressive Strength as a Function of Specimen Orientation

| Stress axis parallel to cylinder direction | Yield strength at 0.2% strain (psi) | Mean yield strength and 95% confidence limits (psi) |
|---|---|---|
| Radial | 35,974 34,520 34,928 33,382 38,044 33,988 | 35,139 ±1756 |
| Tangential | 34,456 37,213 33,043 36,079 34,222 35,294 | 35,218 ±1523 |
| Longitudinal | 34,822 34,109 33,721 32,612 33,333 31,917 34,133 36,687 35,868 | 34,134 ±1157 |

TABLE 4

Mechanical Properties in Tension as a Function of Orientation and Temperature
Aged 12 Hours at 738°C

| Orientation | Temperature | Yield stress | Ultimate tensile stress | Plastic strain to fracture, % |
|---|---|---|---|---|
| Longitudinal | 25°C | 27,619 | 36,785 | 1.96 |
| Tangential | 25°C | 29,583 | 40,625 | 2.03 |
| Longitudinal | 150°C | 25,217 | 35,652 | 6.28 |
| Tangential | 150°C | 25,052 | 34,947 | 5.40 |
| Longitudinal | 260°C | 22,842 | 31,894 | 6.40 |
| Tangential | 260°C | 23,617 | 32,340 | 7.20 |
| Longitudinal | 650°C | 9,677 | 10,107 | 4.45 |
| Tangential | 650°C | 10,625 | 10,833 | 4.40 |

TABLE 5

Elevated Temperature Tensile Properties
Aged 100 Hours at 600°C

| T, °C | YS (psi) 0.2 | UTS (psi) | $E_f$, (%) |
|---|---|---|---|
| 26 | 26,383 | 37,660 | 0.96 |
| 300 | 23,936 | 33,298 | 14.5 |
| 500 | 20,778 | 27,000 | 15.74 |
| 700 | 7,340 | 7,660 | 3.37 |

Aged 200 Hours at 600°C

| 26 | 28,889 | 40,444 | 1.76 |
| 300 | 20,879 | 29,231 | 20.34 |
| 500 | 18,587 | 24,674 | 17.51 |
| 700 | 6,044 | 7,143 | 2.86 |

Aged 100 Hours at 740°C

| 26 | 26,512 | 33,023 | 1.8 |
| 300 | 25,595 | 35,385 | 13.67 |
| 500 | 18,072 | 30,602 | 10.98 |
| 700 | 7,692 | 7,802 | 2.78 |

TABLE 6

Orientation Factors for Sintered Plasma-Consolidated Beryllium of Example II

| j | $\overline{I}_j$ | Orientation Factor, $\Phi_{ij}$ | | |
|---|---|---|---|---|
| | | i=1 | i=2 | i=3 |
| 10$\overline{1}$0 | 33.6 | 0.116 | 0.003 | 0.110 |
| 0002 | 32.4 | 0.160 | 0.108 | 0.055 |
| 10$\overline{1}$1 | 100.0 | 0.0 | 0.0 | 0.0 |
| 11$\overline{2}$0 | 18.0 | 0.028 | 0.005 | 0.033 |
| 10$\overline{1}$3 | 18.0 | 0.117 | 0.089 | 0.028 |
| 11$\overline{2}$2 | 24.4 | 0.049 | 0.00 | 0.053 |

What is claimed is:

1. A process for making a highly densified plasma-consolidated beryllium article comprising the steps:
    a. preparing a plasma-deposited beryllium article from beryllium powder containing a minor amount of impurities, said plasma-deposited article having a theoretical density greater than 85 percent based on 100 percent theoretical density corrected for BeO content according to the formula:

$$\text{Theoretical Density} = \frac{100}{\frac{100 - \%\text{BeO}}{1.847} + \frac{\%\text{BeO}}{3.009}}$$

b. heating said beryllium article in a substantial vacuum below its sintering temperature at a rate less than about 10°C per minute to substantially outgas and thermally desorb the gases and condensed gases occupying the pores and pore surfaces, respectively;

c. sintering said outgassed beryllium article at a temperature between about 1,180°C and about 1,250°C for a period between about 15 minutes and about 6 hours so as to increase the density of said article to greater than 99 percent of theoretical; and d. cooling said densified article to ambient at a rate between about 1°C and about 10°C per minute.

2. A process for making a highly densified plasma-consolidated beryllium article comprising the steps:

a. preparing a plasma-deposited beryllium article from beryllium powder containing a minor amount of impurities, said plasma-deposited article having a theoretical density greater than 85 percent based on 100 percent theoretical density corrected for BeO content according to the formula:

$$\text{Theoretical Density} = \frac{100}{\frac{100 - \%\text{BeO}}{1.847} + \frac{\%\text{BeO}}{3.009}}$$

b. heating said beryllium article in a substantial vacuum below its sintering temperature at a rate less than about 10°C per minute to substantially outgas and thermally desorb the gases and condensed gases occupying the pores and pore surfaces, respectively;

c. sintering said outgassed beryllium article at a temperature between about 1,180°C and about 1,250°C for a period between about 15 minutes and about 6 hours so as to increase the density of said article to greater than 99 percent of theoretical; and d. cooling said densified article to a temperature between about 500°C and about 750°C and holding thereat for a period of at least 10 hours.

3. The process as in claim 1 wherein in step $b$ said beryllium article is heated below its sintering temperature at a rate about 4°C per minute; in step $c$ said outgassed beryllium article is sintered between about 1,190°C and about 1,210°C for a period between about 3 hours and 4 hours; and in step $d$ said densified article is cooled at a rate between about 1.5°C and about 2.0°C per minute.

4. The process as in claim 1 wherein step $a$ said beryllium article has a BeO content of less than 6 percent by weight.

5. The process as in claim 1 wherein in step $a$ said beryllium article has a BeO content of less than 2.5 percent by weight.

6. The process as in claim 3 wherein in step $a$ said beryllium article has a BeO content of less than 6 percent by weight.

7. The process as in claim 3 wherein in step $a$ said beryllium article has a BeO content of less than 2.5 percent by weight.

8. The process as in claim 3 wherein after step $d$ the following step is added:

e. subjecting said densified article to an additional heat treatment at a temperature of between about 500°C and about 750°for a period of between about 10 hours and about 100 hours.

9. A process for making a highly densified plasma-consolidated beryllium article comprising the steps:

a. preparing a plasma-deposited beryllium article from beryllium powder containing a minor amount of impurities, said plasma-deposited article having a theoretical density greater than 85 percent based on 100 percent theoretical density corrected for BeO content according to the formula:

$$\text{Theoretical Density} = \frac{100}{\frac{100 - \%\text{BeO}}{1.847} + \frac{\%\text{BeO}}{3.009}}$$

b. heating said beryllium article in a substantial vacuum below its sintering temperature for a time period sufficient to decrease the as-coated absorbed gas level of the article to below $10^{-4}$ moles per cubic centimeter of porosity;

c. sintering said outgassed beryllium article at a temperature between about 1,180°C and about 1,250°C for a period between about 15 minutes and about 6 hours so as to increase the density of said article to greater than 99 percent of theoretical; and d. cooling said densified article to ambient at a rate between 1°C and about 10°C per minute.

10. A process for making a highly densified plasma-consolidated beryllium article comprising the steps:

a. preparing a plasma-deposited beryllium article from beryllium powder containing a minor amount of impurities, said plasma-deposited article having a theoretical density greater than 85 percent based on 100 percent theoretical density corrected for BeO content according to the formula:

$$\text{Theoretical Density} = \frac{100}{\frac{100 - \%\text{BeO}}{1.847} + \frac{\%\text{BeO}}{3.009}}$$

b. heating said beryllium article in a substantial vacuum to about 500°C and holding thereat for a time period of at least 30 minutes;

c. sintering said outgassed beryllium article at a temperature between about 1,180°C and about 1,250°C for a period between about 15 minutes and about 6 hours so as to increase the density of said article to greater than 99 percent of theoretical; and d. cooling said densified article to ambient at a rate between about 1°C and about 10°C per minute.

* * * * *